Patented Dec. 2, 1930

1,783,551

UNITED STATES PATENT OFFICE

LEONARD WICKENDEN, OF FLUSHING, NEW YORK, ASSIGNOR TO JOHN J. NAUGLE, OF RYE, NEW YORK

METHOD OF TREATING SACCHARINE FLUIDS

No Drawing. Original application filed November 6, 1925, Serial No. 67,463. Divided and this application filed May 3, 1927. Serial No. 188,612.

My present invention relates to methods of treating saccharine fluids by the use of invertase-containing preparations, by which I mean preparations intended to convert or invert sucrose-containing substances into monosaccharide-containing or invert-sugar-containing substances, and aims to devise methods of the character specified which make it possible, in an economical and practical way, to utilize preparations of the general character specified which are relatively easy to prepare, which are comparatively cheap, which are characterized by an unusually high degree of activity and by excellent keeping qualities and which do not introduce any undesirable foreign substances into the saccharine fluids with which they are intended to be used. My invention aims to devise methods of inverting sucrose-containing fluids, especially by the use of the aforesaid invertase-containing preparations, which methods are characterized by their simplicity, the economy in time and materials with which they may be practiced, and the superiorities of the resulting product. Other advantages of the methods of the present invention will in part be pointed out in detail hereinafter and will in part be obvious to those skilled in the art to which the present invention relates.

In the accompanying specification I shall describe a method of utilizing the invertase-containing preparation referred to above for the inversion of sucrose-containing substances in the production of monosacchride-containing or invert-sugar-containing substances. It is, however, to be clearly understood that my invention is not limited to the specific form thereof herein described for purposes of illustration only. The present application is a division of my previously filed application Serial No. 67,463, filed November 6, 1925, and entitled "Invertase preparation, and methods of preparing and utilizing the same."

Before describing the aforesaid illustrative embodiment of the present invention in detail, it may be desirable briefly to point out the shortcomings and disadvantages of the prior art so far as it relates to the invertase-containing preparations hitherto prepared and used in the arts, and to the methods of preparing and utilizing such invertase-containing preparations. In the methods hitherto used for preparing invertase-containing preparations, compressed yeast has been kneaded with water and some preservative, such as chloroform or toluene, and permitted to liquefy spontaneously. The resulting liquid is then filtered with or without dilution, the resulting liquid being as a rule a somewhat cloudy solution. Toluene is almost invariably added to this solution to act as a preservative.

Partly due to the cost of the materials used and partly due to the difficulties encountered in filtering and otherwise preparing and handling this preparation, the commercial invertase-containing preparations in solution form now on the market are comparatively high in price, averaging around $8.00 to $9.00 per gallon. Moreover, the presence of toluene in the invertase-containing solution, being a substance which is to be used in a product which will ultimately be employed for human consumption, is undesirable. Furthermore, the resulting preparations as obtained above are relatively inactive.

I have discovered methods whereby the aforesaid disadvantages and shortcomings of the prior art, both with regard to the invertase-containing preparations themselves, as well as with regard to the methods of preparing and utilizing the same, may be largely avoided and a preparation obtained which is highly active, altogether fit for use in substances ultimately intended for human consumption, and which may be prepared by simple methods and utilized in a superior way for the purposes for which such invertase-containing preparations are customarily employed.

Referring first to the aforesaid illustrative embodiment of the method of the present invention and referring to the method for preparing the invertase-containing preparations covered by my co-pending application identified above, I mix yeast, which has preferably been previously air dried and which is preferably in granular form, with a suitable amount of water, preferably about an equal weight of water, until the mixture forms a more or less smooth paste. To the paste thus produced, I add a suitable amount, preferably an equal weight, of a sugar syrup. Preferably this syrup contains sucrose and contains also about 50 to 55 per cent. of the weight of its sugar solids in the form of monosaccharides, preferably in the invert condition. For example, the sugar employed may be a 42° Baumé syrup containing about 50 per cent. of the weight of its sugar solids in the invert condition.

I prefer that the syrup thus added to the yeast paste or its equivalent shall be sensibly acid. I have found that if the syrup is alkaline it will tend to destroy the invertase in the yeast, this destruction being rapid if the degree of alkilinity is high and being less rapid, but no less certain, if the degree of alkalinity is low. However, care should be taken that the degree of acidity of the syrup added to the yeast paste or its equivalent shall not be too high. I have found that for most purposes it is best to adjust the acidity of he syrup added to the yeast paste or its equivalent so that its pH shall be from about 4 to about 5. I have discovered that this degree of hydrogen-ion concentration is very suitable for producing invertase-containing preparations of a high degree of activity.

It is now desirable, in fact practically necessary, to stop the tendency which will develop in the mixture thus far produced to bring about alcoholic fermentation of the sugar syrup in the presence of the yeast. In order to prevent such tendency to alcoholic fermentation, I heat the preparation to a temperature of from about 55 to about 65° C. Preferably I heat the mixtures to about 60° C. for a sufficient length of time, usually about two hours, to kill the live yeast cells. The killing of the live yeast cells substantially completely prevents alcoholic fermentation, but without seriously affecting the activity of the invertase, if the heating is conducted within the temperature range and for about the length of time indicated.

In order to bring about the heating of the mixture in desired manner, I use a steam or hot water bath. By means of suitable thermostatic control of the steam or hot water bath, the mixure is raised to the desired temperature and maintained at that temperature for the desired length of time, about two hours, more or less, depending upon the exact temperature employed, the time being somewhat shorter where the temperature is higher, and somewhat longer where the temperature is lower. It may here be stated that any suitable apparatus may be employed for this purpose, as is well known to those skilled in the art to which the present invention relates.

During the heating operation the color of the mixture darkens somewhat. There is also a certain amount of frothing. Finally, the mixture forms a more or less brown syrup of medium consistency. I have found that the activity of this syrup for inverting sucrose-containing substances, such as sucrose-containing syrups, appears to increase somewhat on standing for a considerable period of time, as about one week. After this ageing or maturing process has been permitted to take place, the activity of the syrup appears to remain constant for a long period of time. As there is apparently no further tendency to decomposition of the yeast content in the preparation after the syrup has been prepared as above described, the mixture remains perfectly sweet and suitable for use in food products over a considerable period of time.

If desired, the invertase-containing syrup prepared as above described may be filtered with or without dilution. I have found, however, that the resulting clear solution will not have such a high degree of activity as the unfiltered syrup, the process of filtration apparently removing some of the active substances.

It may here be stated that the relative proportions of yeast, water and syrup may be varied within considerable limits. For instance, if only one-half of the specified weight of syrup is added to a given quantity of yeast-containing paste, the resulting mixture, is a stiff paste which should be mixed with warm water before being added to the sucrose-containing syrup which it is desired to invert. Such a paste may have certain advantages where the material is to be shipped for any great distance. However, if the invertase-containing preparations of the present invention are to be used substantially in the same localities in which such preparations are manufactured, it is advantageous to use the higher proportions of syrup specified above, as the resulting syrups or liquids will all the more readily mix with a sucrose-containing syrup which it is desired to invert without the necessity of first diluting such preparations with water or its equivalent.

The invertase-containing preparations obtained as above described, especially in the syrup or liquid form, possess an unusually high degree of activity. Weight for weight such preparations are about four times as active as the invertase-containing preparations now on the market. For example, in the Journal of the American Chemical Society for 1914, Vol. 36, page 1567, C. H. Hudson, of the United States Bureau of Agriculture, describes a method of preparing so-called highly activated invertase-containing preparations. This preparation, when added in the proportion of 5 cc. of the preparation to 150 cc. of a 9 per cent. sucrose solution, inverted 50 per cent. of the sucrose in 5.9 minutes.

Using the preparation of the co-pending application referred to above in the syrup or liquid form described above in the same proportion, basing this proportion on the weight of yeast used in preparing the two preparations, such preparation inverted 86 per cent. of the sucrose in 5.9 minutes, as compared with the 50 per cent. inversion obtained with the Hudson preparation on the same type of sucrose-containing solution in substantially the same length of time.

The advantages of the method of the co-pending application referred to above as used for preparing invertase-containing solutions, particularly the aforesaid illustrative embodiment of such method, are numerous and of great practical importance. The method is very simple and may be readily, conveniently and economically practiced. The method utilizes only readily obtainable materials and results in a very superior product for the intended purpose.

The product itself possesses numerous advantages in that it may be readily prepared in a highly active form by the use of readily obtainable materials. The product is furthermore characterized by its freedom from undesirable adulterants or foreign substances, the addition of which to food products in which the preparations may be used would be highly undesirable or even harmful. The product is further characterized by its excellent keeping qualities and its efficiency and other desirable qualities when used for the intended purpose.

Referring now to the aforesaid illustrative embodiment of the method of the present invention as applied to the utilization of the invertase-containing products of the co-pending application referred to above, I take a sucrose-containing syrup, such as an affination syrup, which it is desired to convert or invert into a thick syrup in accordance with the methods of the present invention, and adjust the acidity of such syrup, preferably by adjusting the pH of the syrup. The syrup, for example, may be a 32° Beaumé syrup, which is the average density of affination syrup, and may have its acidity adjusted to such a point that the pH of the corrected syrup will be from about 4 to about 5.

I now heat the syrup prepared as above described to a temperature which will minimize alcoholic fermentation while affecting very little, if at all, the activity of the invertase-containing preparation which is to be used for the inversion process. I have discovered that a temperature of from about 55 to about 65° C., as about a temperature of 60° C., is very suitable for this purpose.

I now add to the treated and heated syrup as above described one of the invertase-containing preparations of the co-pending application referred to above made as above described. In the case of the invertase-containing preparations of the present invention in syrup form, I add to the affination syrup or its equivalent treated as above described about one-fourth of one per cent of such a preparation, based on the weight of the sugar solids in solution in the syrup. Of course, the proportion of invertase-containing preparation to be added may be varied within considerable limits, while still deriving the benefits of the present invention, particularly in the use of the invertase-containing preparations of the present invention.

The action is permitted to continue until the desired degree of inversion has taken place. During this action the temperature of the syrup is preferably maintained between from about 55 to about 65° C., preferably at about 60° C. For example, if a 50 per cent inversion of the sucrose contained in the syrup is desired, the action may be permitted to continue for about twenty hours at the temperature and with the proportion of invertase-containing preparation added to the syrup as above described.

When the desired degree of inversion has taken place, the inverted syrup may be clarified if desired. For this purpose it may be preliminarily diluted, as to a density of about 28° Baumé.

I have discovered that one very satisfactory and successful method of clarifying the inverted syrup, being a method which has proved to be satisfactory in actual commercial practice, is the following: To an amount of syrup containing, for example, about 100 lbs. of sugar solids in solution, and preferably preliminarily diluted to the density above referred to, namely 28° Beaumé, I may add 4 lbs. of the highly activated neutral vegetable carbon, derived from carbonized lignin residues or "leacher refuse," and known to the trade as "Suchar." This vegetable carbon is described and claimed in the patent issued to John J. Naugle, No. 1,701,272, on February 5, 1929. The syrup and the added activated carbon are now sent to a filter press and the recovered carbon, amounting to about 4 lbs. of carbon in the dried condition, is added, together with an additional pound of fresh activated carbon, to another batch of syrup containing about 100 lbs. sugar solids in solution.

This second batch of syrup, containing the used and fresh carbon in suspension, is itself sent to the filter press, where the carbon is removed. The used batch of carbon, now amounting to about 5 lbs. of carbon in the dried condition, is added with one pound of fresh carbon to another batch of syrup containing 100 lbs. of sugar solids in solution. This last batch containing the carbon in suspension is now sent to a filter press where the carbon is removed. The three batches of treated syrup, each containing 100 lbs. of sugar solids in solution, may now be mixed together, yielding a syrup which is clear and which is unusually brilliant. The treated mixed batches of syrup may now be sent to the vacuum pans, where they may be concentrated to a syrup having a density of 42° Beaumé. From the pans, the concentrated syrup may be led to a suitable tank or to suitable containers, such as are used for this purpose, as will be readily apparent to those skilled in the art to which the present invention relates.

The syrup is characterized by its heaviness, its clarity, its brightness and its purity, being low in ash and free from the usual contamination with impurities, such as toluene, ordinarily employed as a preservative for the invertase-containing preparation employed for the inversion of the syrup and some of which may thus be found in the inverted syrup. The resulting syrup is further characterized by the relative cheapness with which it may be prepared and its fine taste and color. The process of inverting sucrose-containing substances, as sucrose-containing syrups, practiced in accordance with the principles of the present invention, especially as exemplified in the foregoing illustrative embodiment of the present invention, possesses many advantages, both technically and commercially, some of which may be briefly enumerated as follows: The process is very simple, requires simple materials and simple apparatus for its practice, and may be very economically and successfully practiced. The process is further characterized by the superiority of the resulting product and the high yield of such product in the form of a pure, clear, bright syrup. Other advantages of the methods of the present invention will readily occur to those skilled in the art to which the same relates.

What I claim as my invention is:

1. The method of inverting sucrose-containing fluids, which comprises the step of adding thereto a mono-saccharide sugar containing syrup containing invertase therein.

2. The method of inverting sucrose-containing fluids, which comprises the step of adding thereto an invert sugar containing syrup containing invertase therein.

3. The method of inverting sucrose-containing fluids, which comprises the step of adding thereto a mono-saccharide sugar syrup containing invertase therein but being substantially free from alcoholic fermentation bodies.

4. The method of inverting sucrose-containing fluids, which comprises the step of adding thereto an invert sugar containing syrup containing invertase therein but being substantially free from alcoholic fermentation bodies.

5. The method of treating sucrose-containing fluids, which comprises the steps of adding thereto an invert sugar containing syrup containing invertase therein and clarifying the fluid after the desired degree of inversion has taken place.

6. The method of treating sucrose-containing fluids, which comprises the steps of adding thereto an invert sugar containing syrup containing invertase therein but being substantially free from alcoholic fermentation bodies and clarifying the fluid after the desired degree of inversion has taken place.

7. The method of treating sucrose-containing fluids, which comprises the steps of adding thereto an invert sugar containing syrup containing invertase therein and diluting and thereafter clarifying the fluid after the desired degree of inversion has taken place.

8. The method of treating sucrose-containing fluids, which comprises the steps of adding thereto an invert sugar containing syrup containing invertase therein but being substantially free from alcoholic fermentation bodies and diluting and thereafter clarifying the fluid after the desired degree of inversion has taken place.

9. The method of treating sucrose-containing fluids, which comprises the steps of adding thereto an invert sugar containing syrup containing invertase therein and diluting and thereafter clarifying and finally concentrating the fluid after the desired degree of inversion has taken place.

10. The method of treating sucrose-containing fluids, which comprises the steps of adding thereto an invert sugar containing syrup containing invertase therein but being substantially free from alcoholic fermentation bodies and diluting and thereafter clarifying and finally concentrating the fluid after the desired degree of inversion has taken place.

11. The method of treating sucrose-containing fluids, which comprises the steps of adding thereto an invert sugar containing syrup containing invertase therein and clarifying successive batches of the fluid after the desired degree of inversion has taken place by means of successive batches of diminishing degrees of activation of a highly activated vegetable carbon.

12. The method of treating sucrose-containing fluids, which comprises the steps of adding thereto an invert sugar containing syrup containing invertase therein but being substantially free from alcoholic fermentation bodies and clarifying successive batches of the fluid after the desired degree of inversion has taken place by means of successive batches of diminishing degrees of activation of a highly activated vegetable carbon.

In testimony, whereof, I have signed my name to this specification this 22nd day of April, 1927.

LEONARD WICKENDEN.